United States Patent
Zhang et al.

(10) Patent No.: US 11,734,479 B2
(45) Date of Patent: Aug. 22, 2023

(54) SIMULATING HYDRAULIC FRACTURING GEOMETRY PROPAGATION USING A DIFFERENTIAL STRESS AND PATTERN-BASED MODEL

(71) Applicant: Landmark Graphics Corporation, Houston, TX (US)

(72) Inventors: Shang Zhang, Tulsa, OK (US); Greg Daniel Brumbaugh, Houston, TX (US); Hailun Ni, Sanford, CA (US); Gaetan Pierre Louis Bardy, Spring, TX (US); Harold Grayson Walters, Tomball, TX (US)

(73) Assignee: Landmark Graphics Corporation, Houston, TX (US)

( * ) Notice: Subject to any disclaimer, the term of this patent is extended or adjusted under 35 U.S.C. 154(b) by 559 days.

(21) Appl. No.: 16/652,619

(22) PCT Filed: May 9, 2019

(86) PCT No.: PCT/US2019/031415
§ 371 (c)(1),
(2) Date: Mar. 31, 2020

(87) PCT Pub. No.: WO2020/226647
PCT Pub. Date: Nov. 12, 2020

(65) Prior Publication Data
US 2021/0256183 A1 Aug. 19, 2021

(51) Int. Cl.
*G06F 30/27* (2020.01)
*E21B 43/26* (2006.01)
(Continued)

(52) U.S. Cl.
CPC .............. *G06F 30/27* (2020.01); *E21B 41/00* (2013.01); *E21B 43/26* (2013.01); *G01V 99/005* (2013.01);
(Continued)

(58) Field of Classification Search
CPC ...... G06F 30/27; G06F 2113/08; G06F 30/23; E21B 41/00; E21B 43/26; E21B 2200/20; E21B 2200/22; G01V 99/005
(Continued)

(56) References Cited

U.S. PATENT DOCUMENTS 8,898,044 B2   11/2014   Craig
9,739,907 B2   8/2017   Camp et al.
(Continued)

OTHER PUBLICATIONS

Somogyvári, Márk, et al. "Synthetic fracture network characterization with transdimensional inversion." Water Resources Research 53.6 (2017). pp. 5104-5123. (Year: 2017).*
(Continued)

*Primary Examiner* — John E Johansen
(74) *Attorney, Agent, or Firm* — Michael Jenney; Parker Justiss, P.C.

(57) ABSTRACT

The disclosure presents a technique to generate a fracture model using a differential stress map and model inputs. The technique simulates the fracture model using fracture fronts, initiated at perforations of a perforation stage of a hydraulic fracturing (HF) wellbore. Each fracture front is evaluated using a propagation step of a fracture model process. Using the relative differential stress states, a fracture pattern is composited to the fracture model. At each propagation step, the total energy available from the simulated HF fluid being pumped into the wellbore location is reduced by the amount necessary to generate the computed fractures. Once the remaining energy is reduced to a level where no further fractures can be created, or if a map boundary is encoun-
(Continued)

tered, the fracture model process terminates. The generated fracture model can be communicated to update HF job plans, wellbore placements, and other uses of the fracture model.

20 Claims, 8 Drawing Sheets

(51) Int. Cl.
| | |
|---|---|
| *G06F 113/08* | (2020.01) |
| *E21B 41/00* | (2006.01) |
| *G01V 99/00* | (2009.01) |
| *G06F 30/23* | (2020.01) |

(52) U.S. Cl.
CPC ....... *E21B 2200/20* (2020.05); *E21B 2200/22* (2020.05); *G06F 30/23* (2020.01); *G06F 2113/08* (2020.01)

(58) Field of Classification Search
USPC .......................................................... 703/10
See application file for complete search history.

(56) References Cited

U.S. PATENT DOCUMENTS

| | | |
|---|---|---|
| 2012/0310613 A1 | 12/2012 | Moos et al. |
| 2014/0222393 A1 | 8/2014 | Bai et al. |
| 2016/0266268 A1 | 9/2016 | Amer |
| 2016/0341850 A1 | 11/2016 | Lin et al. |
| 2017/0051598 A1 | 2/2017 | Ouenes |
| 2017/0145793 A1* | 5/2017 | Ouenes .................. E21B 43/26 |
| 2018/0094514 A1 | 4/2018 | Leem et al. |
| 2018/0128091 A1 | 5/2018 | Harper |

OTHER PUBLICATIONS

Skomorowski, N., M. B. Dussealut, and R. Gracie. "The use of multistage hydraulic fracture data to identify stress shadow effects." 49th US Rock Mechanics/Geomechanics Symposium. OnePetro, 2015. pp. 1-8. (Year: 2015).*

Barree, Robert D., and Jennifer L. Miskimins. "Calculation and implications of breakdown pressures in directional wellbore stimulation." SPE hydraulic fracturing technology conference. OnePetro, 2015. pp. 1-21. (Year: 2015).*

Mao, et al.; "Laboratory hydraulic fracturing test on large-scale pre-cracked granite specimens"; Journal of Natural Gas Sciences and Engineering, vol. 44; www.elsevier.com/locate/jngse; Aug. 2017; 9 pgs.

Zhou, et al.; "Experimental Investigation of Fracture Interaction between Natural Fractures and Hydraulic Fracture in Naturally Fractured Reservoirs"; Society of Petroleum Engineers; EAGE Annual Conference and Exhibition in Vienna, Austria; May 23-26, 2011; SPE-142890-MS; 14 pgs.

* cited by examiner

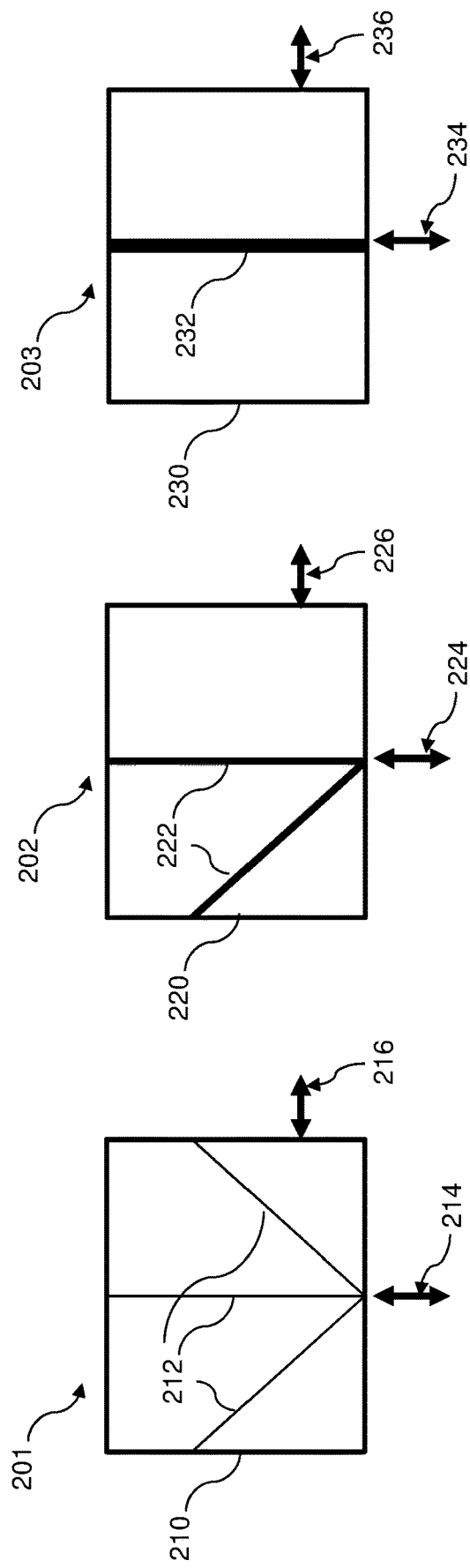

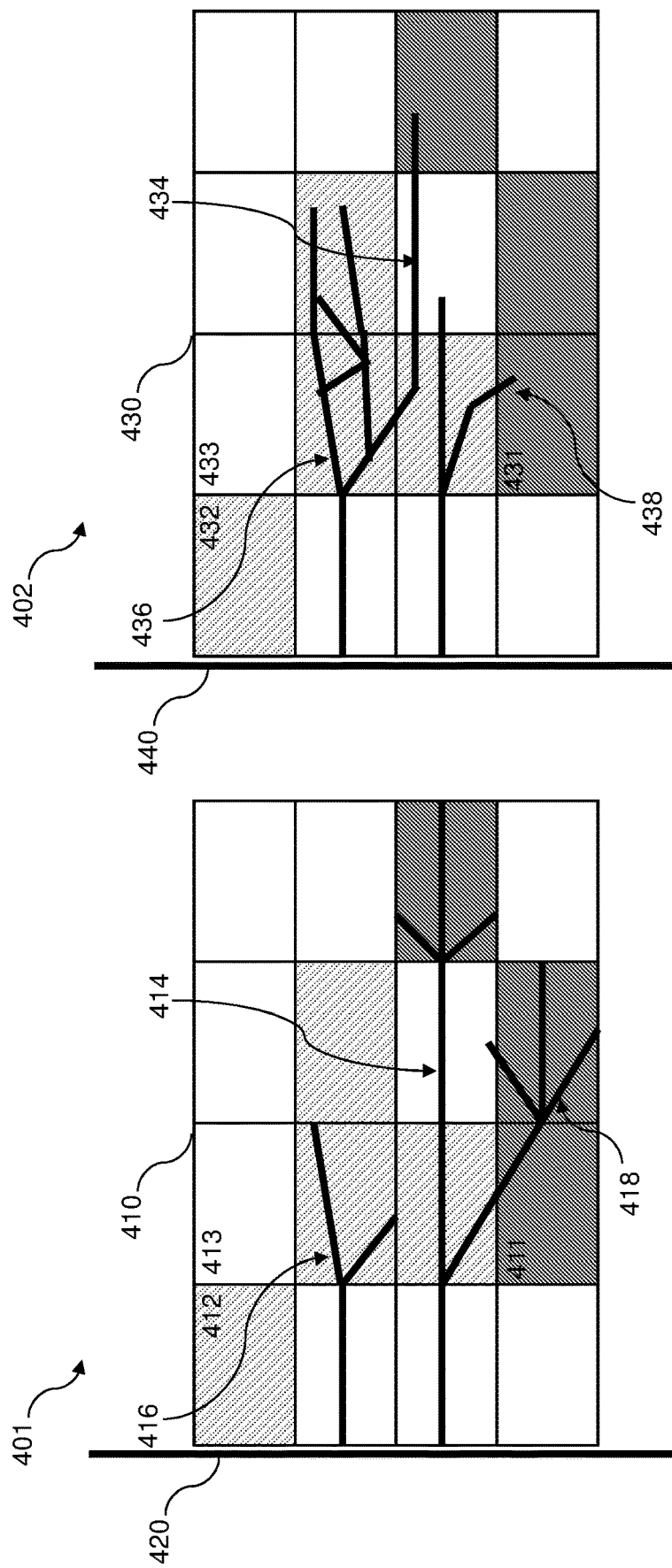

SIMULATING HYDRAULIC FRACTURING GEOMETRY PROPAGATION USING A DIFFERENTIAL STRESS AND PATTERN-BASED MODEL

CROSS-REFERENCE TO RELATED APPLICATION

This application is the National Stage of, and therefore claims the benefit of, International Application No. PCT/US2019/031415 filed on May 9, 2019, entitled "SIMULATING HYDRAULIC FRACTURING GEOMETRY PROPAGATION USING A DIFFERENTIAL STRESS AND PATTERN-BASED MODEL". The above application is commonly assigned with this National Stage application and is incorporated herein by reference in its entirety.

TECHNICAL FIELD

This application is directed, in general, to generating a fracture model for hydraulic fracturing operations and, more specifically, to utilizing simulations and patterns to update the fracture model.

BACKGROUND

Hydraulic and natural fractures can be key components for economic shale oil production. In typical hydraulic fracturing modeling, hydraulic fractures are modeled by symmetric fractures propagating in the plane perpendicular to the minimum principle stress, and natural fractures are often ignored due to the uncertainty and complexity of the earth. The propagation direction and final fracture geometry may be affected by pre-existing fractures and by the interaction between induced fractures and natural fractures. This can be exemplified at low differential stress states resulting in a complex hydraulic fracture network. The final complex geometry of the fracture network can be important to the well system job plan when put into a production phase. The fracture network has a strong relationship with the stimulated reservoir volume and directly affects the value of the well system area.

Typical models may not have the ability to account for local differential stress variations or may be too time consuming to obtain reliable results. A method that can model interactions between hydraulic fractures and natural fractures and provide reasonable results in a timely manner is highly desirable.

BRIEF DESCRIPTION

Reference is now made to the following descriptions taken in conjunction with the accompanying drawings, in which:

FIG. 2A is an illustration of a diagram of an example low differential stress state;

FIG. 2B is an illustration of a diagram of an example medium differential stress state;

FIG. 2C is an illustration of a diagram of an example high differential stress state;

FIG. 4A is an illustration of a diagram of an example grid-based HF geometry propagation;

FIG. 4B is an illustration of a diagram of an example grid-less based HF geometry propagation;

DETAILED DESCRIPTION

Figure 1A:
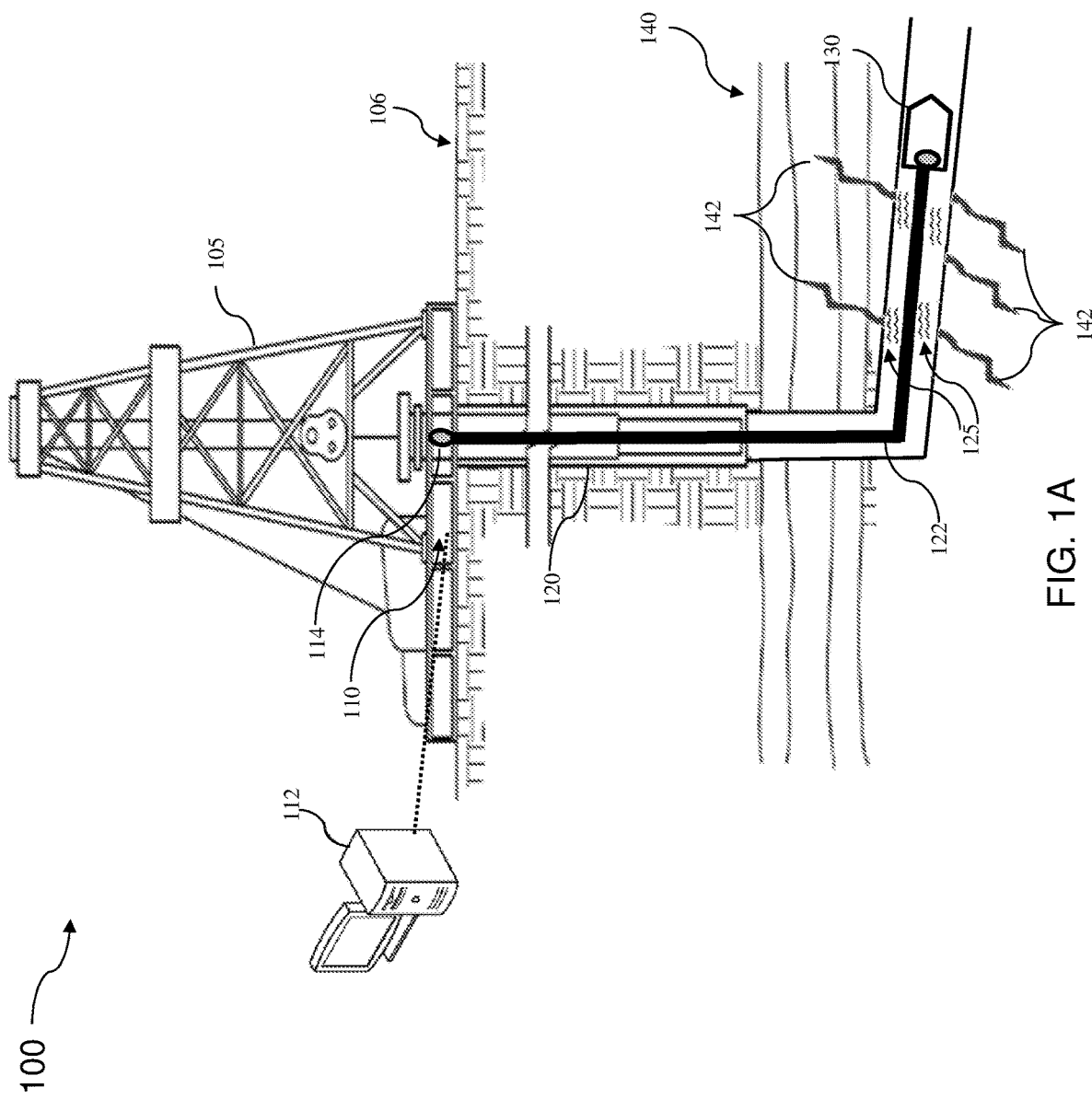
FIG. 1A is an illustration of a diagram of an example hydraulic fracturing (HF) well system.

Typical commercial fracture modeling and design software may not consider the natural fracture network due to the uncertainty and complexity of the earth model. The fracture geometry, i.e., hydraulic fracturing (HF) geometry, from some commercial software utilizes simple geometry, which may not be reliable; especially in shale oil development where hydraulic fractures play a major role in improving stimulated reservoir volume (SRV). The fracture network has a strong relationship with the SRV and directly affects the value of the well system area.

Model based commercial software usually considers rock mechanics as an input and fractures are modeled as simple ellipse shape fractures. These do not consider the local stress field alterations from natural fractures and cannot handle variances in the local stress field. Two major techniques are used when modeling the hydraulic fracture: (1) Griffith's Linear Elastic Fracture Mechanics (LEFM) based methods such as Perkins-Kern-Nordgren (PKN), Khristianovic-Geertsma-deKlerk (KGD), and pseudo three-dimensional (P3D) models; and (2) simulation-based methods such as finite element method (FEM), extended finite element method (XFEM), displacement discontinuity method (DDM), and discrete element method (DEM).

Typical simulation-based models can be used for research purposes since there can be long simulation times. The time and effort can be impractical to import a detailed resolution of the natural fracture network and to execute a modeling technique for the HF geometry propagation, such as DEM simulation.

This disclosure provides insights on how HF can be affected by natural fractures and varying differential stress states that can be beneficial in well planning and wellbore placement, such as building a well system job plan, and HF design in non-typical hydrocarbon developments. In addition, the disclosed techniques can be utilized by a well site controller to modify a HF job at a well system area as updated fracturing information is received in the form of updated well system area stress maps. The disclosed methods can increase confidence in determining where to locate a wellbore in a well system. In addition, the updated well system information can be used to determine where to locate one or more perforation stages of the HF fluid pipe, and how many perforations to include within each stage to maximize hydrocarbon production while minimizing the cost.

The methods and processes, i.e., a fracture model process, described herein for generating a HF geometry propagation model starts with receiving a stress map generated from stress analysis methods such as a Material Point Method (MPM) or other solid mechanics models such as FEM, XFEM, DEM, and DDM. A maximum principal stress direction can be derived from an analysis of the subterranean formation or provided as a user defined input. Using the geological information from the natural fracture network, such as an average natural fracture length distribution, a dipping angle, a strike, an azimuth, and other natural fracture model information, the natural fracture network can be modeled. A local differential stress map can then be generated utilizing the received stress map, the principal stress direction, the far-field stresses, the natural fracture network, and rock properties such as Young's modulus, Poisson's ratio, and density.

The HF geometry propagation model can rotate the local differential stress map so that the propagated hydraulic fractures are in approximate alignment with the maximum principal stress direction. Inputs into the model, i.e., model inputs, can be used to specify parameters, data, defaults, values, and other information for the model to use in its algorithmic processing. For example, model inputs can be the location of the perforation stage, the number of perforations per stage (perforation counts), the interval length in between each perforation (perforation interval lengths), as well as a total energy and a total time step that will be used by the model to constrain the hydraulic fracture length. In some aspects, other inputs can be utilized such as an indicator whether the stress shadow effect will be used, a constant volumetric value to be used for mass conservation computations, rock and other subterranean formation properties, and other model inputs.

After the model inputs are provided, the HF propagation model can initialize the propagation steps of the fracture model process, such as establishing the maximum energy to be expended, i.e., the total energy, and the number of propagation steps to be executed, i.e., the total time step, as well as determine the segment of the local differential stress map that will be used for the current simulation execution. The perforation location can be located and positioned on the local differential stress map.

The segment of the local differential stress map that is to be used can be portioned. The portioning can use a grid-like structure to delineate portions or areas of the local differential stress map. Each portion can be classified by a differential stress state threshold range. For example, a portion can be classified as having a low differential stress state typified by narrow fractures that are highly branched. Other classifications can be a medium differential stress state typified by intermediate fractures that are moderately branched and a high differential stress state typified by wide fractures that are single wing. Each classification can use a predetermined HF geometry propagation pattern as a guide. The pattern applied to that portion of the local differential stress map can be modified by factors included in the model, such as the differential stress states of neighboring portions, the stress shadow effect, and other model factors. In some aspects, there can be additional differential stress states defined, each with their own fracture and branching parameters.

The fracture model process can then analyze the neighboring portions of the current portion, where the neighboring portions have been previously analyzed in a previous propagation step of the fracture process. The HF geometry can be calculated for the current portion using the neighbor portion HF geometry and the model input constraints, and other system constraints. The fracture model process can iterate through each portion of the local differential stress map, continuing to build on the fracture model generated in the previous propagation steps. The fracture model process can terminate when an exit condition is set to true. The exit condition can be set to true from its default of false, for example, when the total energy of the system remaining is too low to continue creating new fractures, the number of propagation steps exceeds the total time step specified, or if the designated portions of the local differential stress map have been analyzed. Other constraints can be utilized as exit conditions as well.

The various constraints can include, but is not limited to, mass and energy conservation, stress shadow effect, multi-fracture interaction, and stress field orientation. The fracture model process takes mass conservation into consideration such that the total injection volume is equal to the total hydraulic fracture volume as demonstrated in Equation 1.

Equation 1: Example mass conservation algorithm $$-\frac{\partial q(x, t)}{\partial x} - q_l(x, t) = \frac{\partial A(x, t)}{\partial t}$$

where $\partial$ is a partial derivative of the indicated values;
q is half of the injection rate;
$q_l$ is the leak-off rate;
A is the fracture cross section area;
x is the linear distance; and
t is time.
If the fluid leak-off volume can be ignored during HF geometry propagation, then $q_l(x, t)=0$.

At the fracture model process initialization, each perforation in the perforation stage can be assigned an initial energy state ($E_s$). This can be provided by the model inputs or another source. The initial energy state value represents the growth of each branch of the fractures. Each local differential stress map portion can have its own specified $E_s$ value depending on the length, width, and complexity of its respective fracture branch. At each propagation step, the $E_s$ values of newly analyzed portions are reduced by a computed amount after the HF geometry has been calculated. The reduction amount is dependent on the final computed fracture pattern and $E_s$ value of the previous analyzed portions.

When the energy of a portion drops to zero, or to an amount where no further fractures are possible, the propagation step terminates at the specific fracture branch. In some aspects, two or more fractures can merge. The merging portion will get a $E_s$ boost due to the fact that additional HF fluid will contribute to the propagation of fractures in the next portion of the local differential stress map. The final energy state of a portion can be expressed as exemplified in Equation 2.

Equation 2: Example energy reduction due to HF geometry and fracture merging $$Es_{i+1} = Es_i - (\lambda - \omega \tau_{i+1}) + \sum_{j=1}^{n} \Delta Es_j$$

where, $E_s$ is the total energy of the specific portion;
i is the propagation step number;
$\omega$ is the weight function of fracture patterns;
$\lambda$ is the maximum energy consumption of propagating one portion;
$\tau$ is the fracture pattern indicator;
n is the number of merging portions;
$\Delta E_s$ is the energy boost from merging portions.
For a three-pattern HF geometry propagation case, $\tau=0$ indicates the fracture uses a high differential stress state pattern; =1 indicates the fracture uses a medium differential stress state pattern; and =2 indicates the fracture uses a low differential stress state pattern.

The stress shadow effect refers to the increase of the horizontal stresses perpendicular to the fracture during HF geometry propagation, usually resulting in an increase in minimum horizontal stress. This increase can alter the principal stress direction. In observations, when propagating a hydraulic fracture in the presence of parallel neighboring fractures, rather than propagating parallel with each other, the neighboring fracture exerts stresses that bend the hydraulic fractures toward the pre-existing fractures and those hydraulic fractures might eventually merge together, converging into a major fracture. This phenomenon can be implemented by relating the energy state to the resistance of the effect, expressed mathematically as demonstrated in Equation 3.

Equation 3: Example stress shadow effect algorithm $$\delta_{ss_i} = \begin{cases} 1, & \xi_i < 0 \\ 0, & \xi_i \geq 0 \end{cases}$$

$$\xi_i = Es_i - \eta Es^0$$

where, $\delta_{ss}$ is the stress shadow effect Kronecker delta function;

$\zeta$ is the stress shadow effect resistance of the fracture portion;

$\eta$ is the stress shadow effect resistance criteria, $\eta \in [0,1]$;

$Es^0$ is the initial energy state of the fracture branch;

$Es$ is the energy state of the portion; and i is the propagation step number.

The stress shadow effect resistance criteria $\eta$ is a user-specifiable value that controls when the merging will happen. This can be provided as part of the model inputs. If the criteria $\eta$ is one, the portion will analyze the surrounding pre-existing fractures and, due to the stress shadow effect, will tend to propagate in a merging trend. If the criteria $\eta$ is zero, the portion will ignore the surrounding pre-existing fractures, therefore ignoring the stress shadow effect.

With certain resistance criteria, if the energy state of the current portion is above the resistance threshold, e.g., $\eta Es^0$, the stress shadow effect resistance will be greater than zero. Therefore, in the current HF geometry propagation step, e.g., iterative step, the portion will not be affected by local stress changes caused by the propagation of pre-existing fractures around it. If the current portion is equal to or lower than the resistance threshold, the stress shadow resistance becomes less than zero, meaning the portion will be affected by pre-existing fractures and will begin propagating toward the closest neighboring fracture.

After the previously mentioned constraints are considered, the final HF geometry can be determined by the fracture model process for every portion in the current propagation step. The fracture model process can ensure that the propagated hydraulic fractures are in alignment with the maximum stress field direction. The next propagation step can be executed where the fracture model process analyzes the next set of local differential stress map portions that are proximate to the previously analyzed portions. This can effectively create a HF geometry propagation front that moves in a direction with each propagation step of the fracture model process.

In an alternative aspect, the analyzed local differential stress map portions can be examined through a pre-processing verification that can check the following criteria. (1) Is the new portion out of boundary? If the answer is yes, then the fracture will stop propagating within this fracture branch. In some aspects, a warning message can be issued to a user. The current portion will be bypassed and the fracture model process will continue with other available portions or increment the propagation step.

(2) Is the new portion already fractured? If the answer is yes, then the new HF geometry is merging into the pre-existing fracture. This can occur, for example, when there is an existing natural fracture at this location. The propagation step at this fracture branch will stop and the merged portion will receive an energy boost from the additional source of HF fluid. The fracture model process can then proceed with the next possible portion or increment the propagation step.

(3) Is there enough energy state left to fracture this portion, i.e., is the total energy value sufficient to fracture the current portion? If the answer is no, then the fracture will stop propagating within the current portion of the fracture branch. In some aspects, a notification message can be sent to a user. The fracture model process can then proceed with the next possible portion or increment the propagation step.

(4) Is there enough energy state to generate the complete HF geometry, i.e., is the total energy value sufficient for the HF geometry? If the answer is no, then the fracture will generate the next most energy affordable HF geometry. The fracture model process can continue operating with the current portion. It is possible that a three-branch fracture pattern can be reduced to a two or one branch fracture pattern due to the amount of energy available to perform the HF.

(5) Is the energy state above the stress shadow resistance threshold, i.e., is the total energy value sufficient to enable a stress shadow effect? If the answer is no and the stress shadow effect resistance criteria equals one, the fracture will propagate in the direction toward the nearest pre-existing fracture portion. Otherwise, the fracture will propagate normally. If the pre-processing verifications are satisfied with the alternate resultant, then the fracture model process continues processing normally.

The final output from the fracture model process is a fracture model that can be a realization of a single hydraulic fracture stage with multiple main fractures. These hydraulic fractures can vary significantly in complexity, length, area, and conductivity depending on the local stress field induced by the natural fracture network. In some aspects, a user can specify different well lengths, orientations, and hydraulic fracture stages, such as through the model inputs. These additional model inputs can be used, for example, to simulate the complete multi-stage hydraulic fracture pattern for a horizontal well, or wells of other orientations.

The fracture model process can utilize a grid or grid-less style portions to propagate the HF geometry. Using a grid-based approach, mass conservation can be used so that the fracture volume can be calculated volumetrically at the end of each propagation step. Thus, by knowing the injection rate, the time of each propagation step can be obtained.

Using a grid-less approach, at each propagation step, the fracture volume increment can be constant, if the HF fluid injection rate is set to be constant, such as with a user specified value in the model inputs. The propagation of the geometry can be calculated during each propagation step. The HF geometry calculations and the pre-processing remains substantially similar to the grid-based approach. A difference is with the output of each calculation. In the grid-less approach, an exact coordinate of the HF geometry can be calculated, as opposed to the grid-based approach where the HF geometry is calculated on the entire portion being analyzed.

When using the grid-less approach, the angle and length of the HF geometry for each fracture front can be calculated utilizing the fracturing operation parameters and fracture pattern, and then enforcing mass conservation. The advantages of the grid-less approach is that the propagation model can be more dynamic and can be more applicable for real-time propagation prediction. The fracture network geometry, e.g., the stress map, can be obtained at a specified time in the fracturing process from, for example, a well site controller.

In another aspect, a machine learning algorithm can be implemented within the fracture model process. A machine learning algorithm can utilize additional experimental and field data, such as micro seismic data, to generate additional differential stress classifications that have more realistic defined fracture patterns. Actual fracture geometries from specific field or laboratory tests of specific core samples can be categorized as the differential stress classifications. This can lead to the HF geometry being more accurate and reliable.

In addition, the machine learning algorithm can utilize additional earth-based parameters for example, rock properties for leak-off volume correction, which are typically ignored by current HF model processes. The additional data and parameters can lead to more accurate HF geometry predictions.

Turning now to the figures, FIG. 1A is an illustration of a HF well system 100. HF well system 100 can be a well system where HF operations are occurring through the implementation of a HF job plan. HF well system 100 demonstrates a nearly horizontal wellbore undergoing a fracturing operation. Although FIG. 1A depicts a specific wellbore configuration, those skilled in the art will understand that the disclosure is equally well suited for use in wellbores having other orientations including vertical wellbores, horizontal wellbores, slanted wellbores, multilateral wellbores, and other wellbore types. FIG. 1A depicts an onshore operation. Those skilled in the art will understand that the disclosure is equally well suited for use in offshore operations.

HF well system 100 includes a surface well equipment 105 located at a surface 106, a well site control equipment 110, and a HF pump system 114. In some aspects, well site control equipment 110 is communicatively connected to a separate computing system 112, for example, a separate server, data center, cloud service, tablet, laptop, smartphone, or other types of computing systems. Computing system 112 can be located proximate to the well site control equipment 110 or located a distance from the well site control equipment 110.

Extending below the surface 106 from the surface well equipment 105 is a wellbore 120. Wellbore 120 can have zero or more cased sections and a bottom section that is uncased. Inserted into the wellbore 120 is a fluid pipe 122. The bottom portion of the fluid pipe 122 has the capability of releasing HF fluid 125 in the fluid pipe 122 to the surrounding formations 140. The release of HF fluid 125 can be by perforations in the fluid pipe 122, by valves placed along the fluid pipe 122, or by other release means. At the end of the fluid pipe 122 is a bottom hole assembly (BHA) 130.

In HF well system 100, fluid pipe 122 is releasing HF fluid 125 into the formation 140 at a determined HF fluid pressure and flow rate. The HF fluid 125 is being absorbed by several active fractures 142. The fracture model generated using the described processes herein can be utilized as an input into a HF job plan for the HF well system 100. The insights gained from the fracture model can be used by the well site control equipment 110 to control the HF fluid pressure and flow rate, as well as where to locate the perforation stages and the number and location of each perforation.

Well site control equipment 110 can include a HF fluid monitor system capable of receiving the HF data, such as the HF fluid pressure values, the HF fluid rate absorption values, and the HF fluid composition. Well site control equipment 110 and computing system 112 can include a HF breakdown analyzer which can provide model inputs into the fracture model process when a subsequent analysis is conducted of HF well system 100.

In an alternative aspect, computing system 112 can be located a distance from the HF well system 100, such as in a data center, server, or other system, and computing system 112 can be disconnected from the HF well system 100. In this aspect, computing system 112 can receive one or more sets of HF data from a data source, where the sets of HF data were previously gathered by HF well system 100 or other HF well systems. The HF breakdown analyzer can be part of computing system 112 and can produce a recommendation on the model inputs for the fracture model process, such as the HF fluid pressure ramp up, the HF fluid flow rate, the HF fluid composition, and other parameters.

Figure 1B:
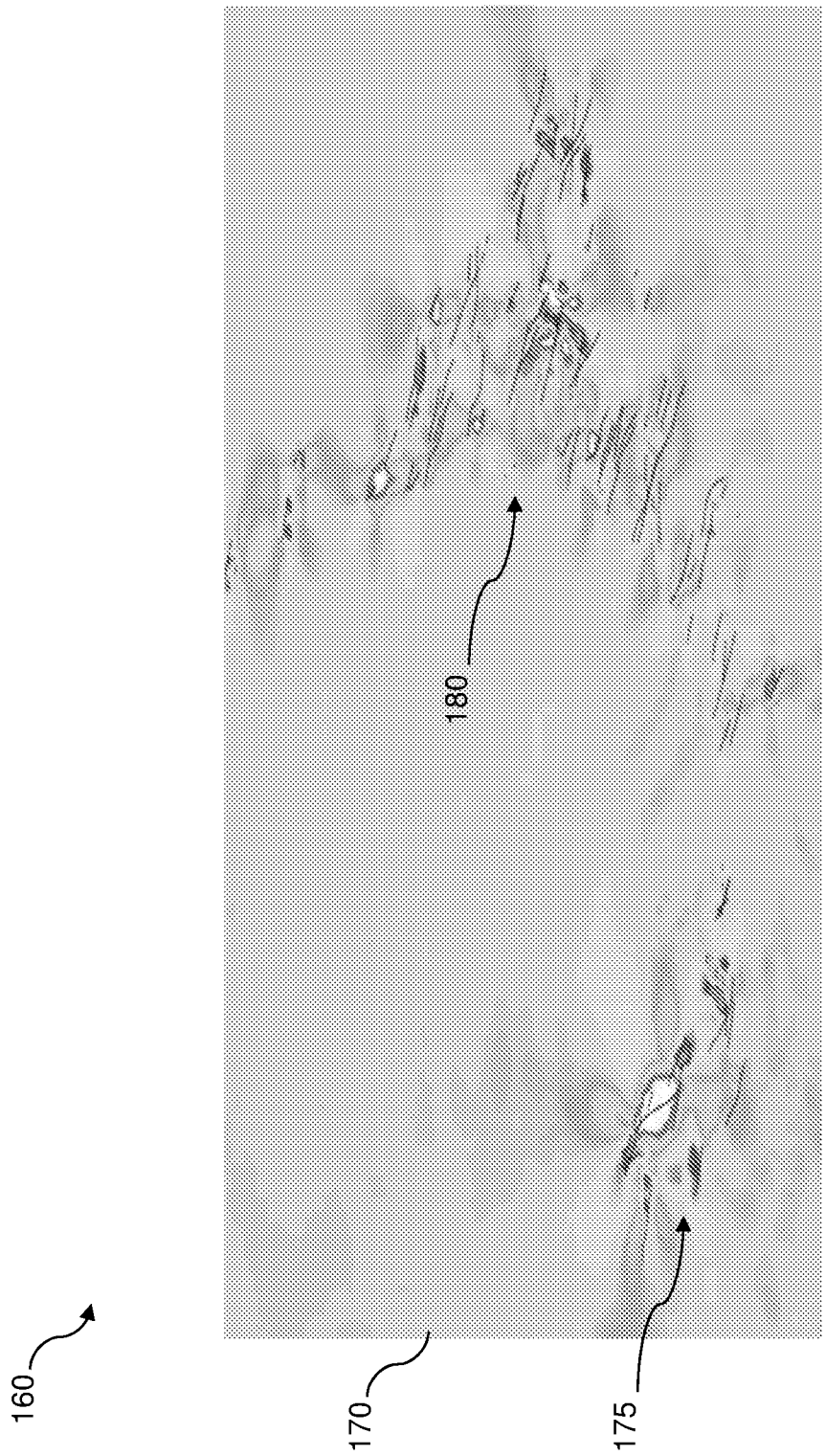
FIG. 1B is an illustration of an image of an example differential stress map.

FIG. 1B is an illustration of an image of an example differential stress map 160. Differential stress map 160 can be generated using various techniques, such as MPM, and can be a stress map of a subterranean formation or region of interest, such as the formation 140 in FIG. 1A. Differential stress map 160 includes a collection of data 170 represented as a visual map. In some aspects, collection of data 170 can be represented by data stored in a computing system, such as a database.

There are two types of data element sets highlighted in the differential stress map 160. Data element set 175 is represented by a darker shaded area and data element set 180 is represented by a lighter shaded area. Data element set 175 can be a natural fracture and data element set 180 can be a stressed portion of the subterranean formation that has not yet fractured. The collection of data 170 can be used to generate the local differential stress map for use in the fracture model processes.

FIGS. 2A, 2B, and 2C represent three possible classifications for respective portions of a differential stress map. The respective figures demonstrate a visual representation of the fracture patterns that can be used in the fracture model processing. The classifications can be stored as data in a computing system without the visual representation. In addition, in other aspects, additional classifications can be identified along with a respective fracture pattern representation. As additional classifications are identified, there can be an increase in the amount of processing time to complete the simulation; therefore a balance can be established between a finer granular detail of the resulting fracture model and the time to produce the fracture model.

FIG. 2A is an illustration of a diagram of an example low differential stress state 201. Low differential stress state 201 is represented by a grid area 210 that can be a specified size. The size can be a default value or specified as part of model inputs. The grid sizes can be adjusted at the start of each propagation step and each new grid location can have a corresponding differential stress state. When implementing a grid-less aspect of the disclosure, the grid area 210 can be of a size appropriate for the energy expended for the propagation step being analyzed.

The grid area 210 includes three narrow fractures 212. Low differential stress state 201 is typified by narrow fractures that are highly branched. Narrow fractures 212 represent the fractures that can be simulated. Other patterns can be used as well, for example, including more than three branches, or where the branches are represented at different angles form the initial fracture path. The selection of the pattern to use can utilize model input information to enable the determination. Grid area 210 also demonstrates a maximum principle stress direction 214 and a minimum principle stress direction 216.

FIG. 2B is an illustration of a diagram of an example medium differential stress state 202. Medium differential stress state 202 is represented by a grid area 220. When implementing a grid-based aspect of the disclosure, the grid area 220 should be the same size as grid area 210. This allows for a regular grid pattern to be used in the propagation steps. When implementing a grid-less aspect of the disclosure, the grid area 220 can be of a size appropriate for the energy expended for the fracture front propagation step being analyzed. The grid area 220 size can be the same or a different size from the other grid areas.

The grid area 220 includes two medium width fractures 222. Medium differential stress state 202 is typified by medium width fractures that are moderately branched. Medium width fractures 222 represent the fractures that can be simulated. Other patterns can be used as well, for example, having the fracture branches extend to the right instead of the left. The selection of the pattern to use can utilize model input information to enable the determination. Grid area 220 also demonstrates a maximum principle stress direction 224 and a minimum principle stress direction 226.

FIG. 2C is an illustration of a diagram of an example high differential stress state 203. High differential stress state 203 is represented by a grid area 230. When implementing a grid-based aspect of the disclosure, the grid area 230 should be the same size as grid area 210. When implementing a grid-less aspect of the disclosure, the grid area 230 can be of a size appropriate for the energy expended for the fracture front propagation step being analyzed. The grid area 230 size can be the same or a different size from the other grid areas.

The grid area 230 includes one wide fracture 232. High differential stress state 203 is typified by wide fractures that are typically single wing. Wide fracture 232 represents the fractures that can be simulated. Other patterns can be used as well. The selection of the pattern to use can utilize model input information to enable the determination. Grid area 230 also demonstrates a maximum principle stress direction 234 and a minimum principle stress direction 236.

Figure 3:
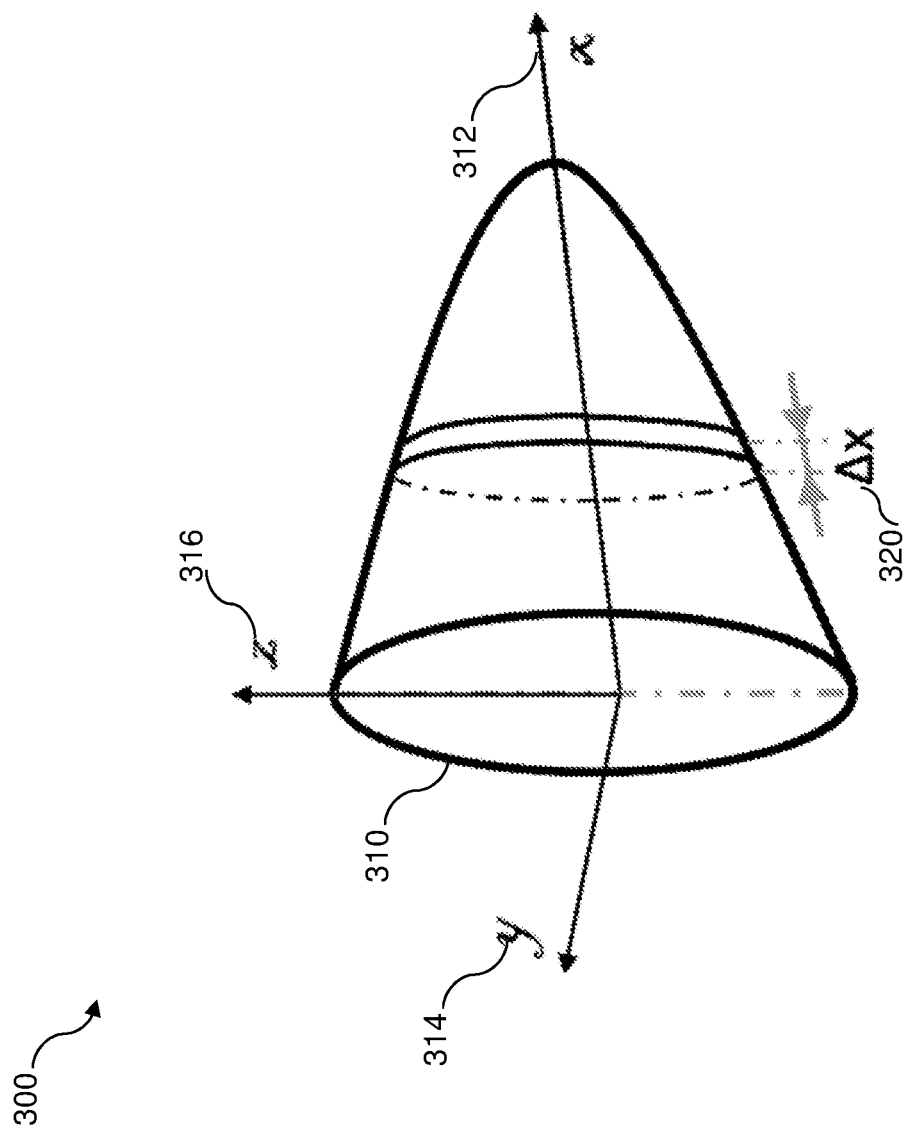
FIG. 3 is an illustration of a schematic diagram of an example fracture segment control volume.

FIG. 3 is an illustration of a schematic diagram of an example fracture segment control volume 300. Fracture segment control volume 300 can be utilized as a mass conservation algorithm to compute the change in a fluid pressure and volume shape as the fluid is injected into a fracture. Fracture segment control volume 300 includes a shaped region 310 that represents the HF fluid flowing from a larger area to a smaller area and exerting fracturing pressure in the smaller area. The x-axis 312 represents the distance from the previous differential stress map portion or from the perforation stage location. The y-axis 314 represents the distance along a plane that includes the perforation stage location and the x-axis 312. The z-axis 316 represents the perpendicular distance from the plane formed by the x-axis 312 and the y-axis 314.

The change in the x-axis due to the computations made during the current propagation step of the fracture front computations is represented by Δx 320. The fracture segment control volume 300 uses mass conservation such that the total injection volume of HF fluid equals the total HF volume. Fracture segment control volume 300 can be represented by Equation 1. Other fracture segment control volume equations and algorithms can be utilized as well.

FIG. 4A is an illustration of a diagram of an example grid-based HF geometry propagation 401. Using a grid-based propagation, regular patterns can be composited to form the grid-based HF geometry propagation 401. The grid-based HF geometry propagation 401 includes a grid 410 alongside a portion of a wellbore wall 420. Grid 410 can be a regular square grid overlaid on the local differential stress map. Grid 410 can provide the coordinates for each of the HF geometry to be placed and oriented. Grid 410 includes grid locations that represent a low differential stress state 411 (exemplified by the dark shaded grid locations), a medium differential stress state 412 (exemplified by the angle lined grid locations), and a high differential stress state 413 (exemplified by the white grid locations). A single one of each different type of stress state is denoted by an element number in FIG. 4A. The low, medium, and high differential stress states 411, 412, and 413 are provided as a demonstration. The stress states used can be determined by the process utilizing the local differential stress map.

Wellbore wall 420 represents a wall of the wellbore, such as a side wall, bottom wall, or top wall that includes the perforation stage. In the simulated processing, HF fluid can be pumped into the wellbore portion containing the wellbore wall 420, and then the HF fluid can be forced to enter one or more fractures, opening additional fractures.

Grid location 414 represents the HF geometry that can be used in a grid location that has been identified as being in the high differential stress state 413. This is shown as a single wing fracture pattern. Grid location 416 represents the HF geometry pattern that can be used in a grid location that has been identified as being in the medium differential stress state 412. This is shown as a moderately branched fracture pattern. The fractures can be implemented using different angles from the main branch. For example, in a simple simulation, an angle of 45 degrees can be used. As additional stress states are defined and if a stress shadow effect is being utilized, other angles can be utilized to better refine the results. In grid location 416, since the grid location above is a high differential stress state 413 and the lower grid location is a medium differential stress state 412, the fracture will tend to branch/angle towards the lower differential stress state, e.g., the lower grid location.

Grid location 418 represents the HF geometry pattern that can be used in a grid location that has been identified as being in a low differential stress state 411. This is shown as a highly branched fracture pattern. In this example, the top fracture line in grid location 418 is likely to stop and not further propagate as it intersects with the grid location 414 with its high differential stress state 413. Each propagation step of the fracture model process can analyze one grid location, or one grid location from each fracture branch.

FIG. 4B is an illustration of a diagram of an example grid-less based HF geometry propagation 402. Using a grid-less based propagation, irregular patterns can be composited to form the grid-less based HF geometry propagation 402. The grid-less based HF geometry propagation 402 includes a grid 430, similar to grid 410, alongside a portion of a wellbore wall 440. Grid 430 can be a regular square grid overlaid on the local differential stress map. Grid 430 includes grid locations that represent a low differential stress state 431 (exemplified by the dark shaded grid locations), a medium differential stress state 432 (exemplified by the angle lined grid locations), and a high differential stress state 433 (exemplified by the white grid locations). A single one of each different type of stress state is denoted by an element number in FIG. 4B. The low, medium, and high differential stress states 431, 432, and 433 are provided as a demonstration. The stress states used can be determined by the process utilizing the local differential stress map.

In some aspects, the stress states for the grid location can be determined by the fracture model process during each propagation step. This can occur when dynamic or variable grid sizes are being utilized. The resulting stress states can influence the HF geometry as well as the constant fracture volume utilized for each propagation step. The fracture pattern can vary as the size and number of fractures varies in previous propagation steps.

Wellbore wall 440 represents a wall of the wellbore, such as a side wall, bottom wall, or top wall that includes the perforation stage. In the simulated processing, HF fluid can be pumped into the wellbore portion containing the wellbore wall 440, and then the HF fluid can be forced to enter one or more fractures, opening additional fractures.

To complete each propagation step computing of each fracture front, the angle and length of each fracture front segment can be calculated, using the constant volumetric values determined at the start of the fracture model process. Similar fracture patterns can be utilized as used in the grid-based HF geometry, while using the mass conservation properties of the HF fluid volume. For example, a high differential stress state 433 grid location can use an angle of 0 degrees and a length of L (single wing fracture). L is the length of the fracture using the constant volume value. A medium differential stress state 432 grid location can use two fracture branches at plus or minus 45 degrees from the original fracture, each with a length of L/2. A low differential stress state 431 grid location can use three fracture branches, one at 0 degrees, one at plus 45 degrees, and one at minus 45 degrees from the original fracture plane. The length of each fracture can be L/3.

Grid location 434 is demonstrating a single wing fracture within a high differential stress state 433 grid location. Grid location 436 is demonstrating a more complicated fracture pattern, as compared to the grid location 416. Using the constant volumetric algorithm, at each propagation step of the fracture model process, new HF geometry can be determined. This can result in multiple HF geometries within a single grid location. Similar factors apply as described in the grid-based HF geometry propagation 401, such as the branch angling can be influenced by the neighboring differential stress states and whether stress shadow effects are being utilized.

Grid location 438 is demonstrating the beginning of a new fracture in a low differential stress state 431 grid location. In future propagation steps, the fracture may have multiple branches. The predominate branch may angle toward the grid location to the right, which is also a low differential stress state grid 431 location. The grid-less based HF geometry propagation 402 can generate a more refined fracture model than the grid-based version, at a cost of a higher computing system time.

The grid location size used in the grid-based HF geometry propagation 401 or the grid-less based HF geometry propagation 402 can be of various sizes. The size can be determined by the subterranean formation characteristics. The size can also be determined by the amount of computing system time to be spent on the fracture model process. Smaller grid sizes can increase the granular details of the fracture model. Smaller grid sizes can also utilize a smaller loss of energy as each grid location is evaluated, therefore leading to a larger number of propagation steps to complete the fracture model, e.g., the longer the fracture model process will take to exhaust the total energy value.

In an alternative aspect, when using the grid-less based approach, the grid sizes can be determined at the start of each propagation step. The grid locations for the next fracture front can be analyzed. Using the local differential stress map and the total energy remaining for a fracture branch, a new grid size can be determined along with a corresponding differential stress state. For example, utilizing a previous propagation step, the fracture model process can determine that a particular fracture branch would benefit from additional granular detail. The grid locations at that fracture front can be resized smaller to provide that additional level of detail, while keeping larger grid sizes in other locations. This dynamic resizing can take advantage of being able to compute finer details while minimizing the computing costs in grid locations that do not need the finer level of detail.

Figure 5A:
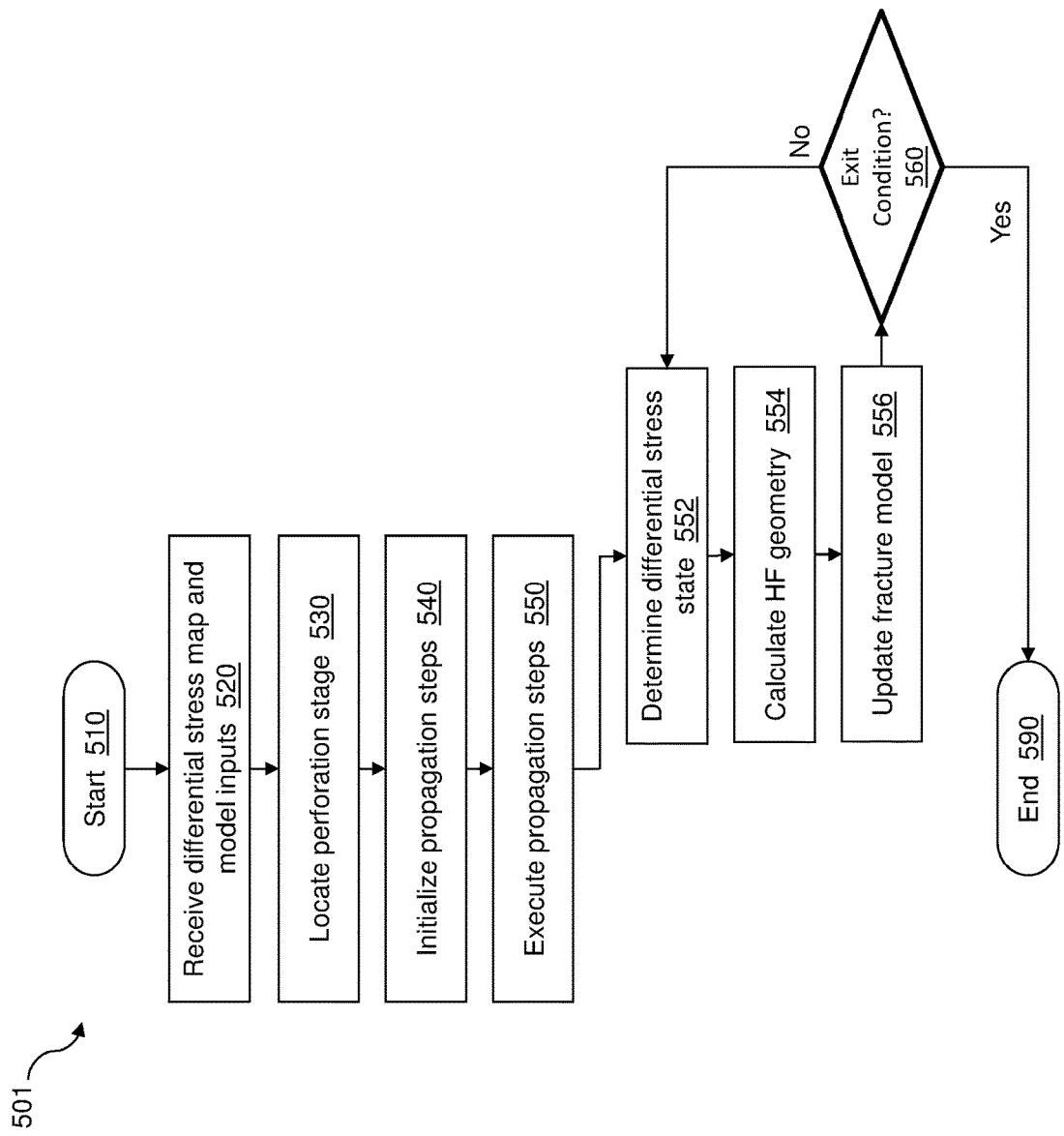
FIG. 5A is an illustration of a flow diagram of an example method to generate a fracture model.

FIG. 5A is an illustration of a flow diagram of an example method 501 to generate a fracture model. The method 501 represents an algorithm that can be used to generate a fracture model. In one example, the method 501, or at least some of the steps of the method 501, can be performed by an HF modeler as disclosed herein; such as HF modeler 610 of FIG. 6 that includes a fracture modeler 614. Method 501 starts at a step 510 to initiate a fracture model process and then proceeds to a step 520. In a step 520, a differential stress map and model inputs can be received. The differential stress map can be calculated from a stress analysis method, such as MPM. The differential stress map can then be rotated according to the direction of actual far field stresses. The fracture model process will initiate the parameters utilizing the received model inputs, such as grid size, principle stress orientation, wellbore orientation, perforation stage location, perforation counts, perforation interval lengths, specified values, such as whether the stress shadow effect is being used, the differential stress states that are defined, the fracture patterns to be used, and other model inputs and values.

In a step 530, the perforation stage can be located relative to the differential stress map, for example, the perforations can be perpendicular to the course of the well and their specific position can be determined by a default parameter such as aligning a specified number of perforations in a specific wellbore zone. In a step 540, the propagation steps of the fracture model process are initialized. The local differential stress map can be generated from the received information, including identifying the differential stress state for each grid overlaid on the differential stress map. The fracture structures to hold the fracture model can be created as well as the fracture front information to store the total energy loss as each grid location is analyzed through the fracture model process. Other simulation constructs can also be initialized.

In a step 550, the propagation steps are executed. The execution can iterate through the grid locations of the local differential stress map using the propagation steps. The propagation steps can begin with the grid locations proximate to the perforations as indicated by the perforation stage location information. At each propagation step, a subsequent grid location can be analyzed, e.g., analyzing the next fracture front segment.

The propagation step starts with a step 552 where a grid location is identified to be analyzed. The differential stress state information for the grid location can be retrieved along with previous HF geometry already calculated. In some aspects, a pre-processing step can be performed to determine whether the current grid location should continue to be modeled. The pre-processing steps can determine (1) whether the new grid location is out of the boundary, (2) whether the new grid location already includes a fracture, (3) whether there is enough energy to perform a fracture, (4) whether there is enough energy to generate the potential HF geometry pattern or whether the HF geometry pattern needs to be reduced, and (5) whether the remaining energy is above the stress shadow resistance threshold.

In a step 554, the HF geometry can be calculated using the algorithms as described herein. If the grid-less based model is being used, then the volumetric conservation analysis is conducted to determine the angle and length of each new fracture. If the grid-based model is being used, then the appropriate fracture pattern can be identified for the grid location. In a step 556, the fracture model is updated with the newly calculated HF geometry. The fracture front structure can store the updated fracture model and be used in future propagation steps to identify where future fractures can originate as utilized in the step 554 calculations.

In a decision step 560, an analysis can be conducted to determine if the exit condition has been met. The exit condition can use one or more conditions to set the exit condition to true from the default of false. For example, if the total energy remaining falls below a level where no new fractures can be calculated, then the exit condition is set to true. In addition, if the grid locations have been analyzed or if the received differential stress map has been analyzed, then the exit condition is set to true. Various messages and alerts can be sent to a log file, application, system, or user indicating the reason for terminating the propagation steps. If the exit condition is false, then the method 501 returns to step 552. If the exit condition is true, then the method 501 proceeds to a step 590 and ends.

Figure 5B:
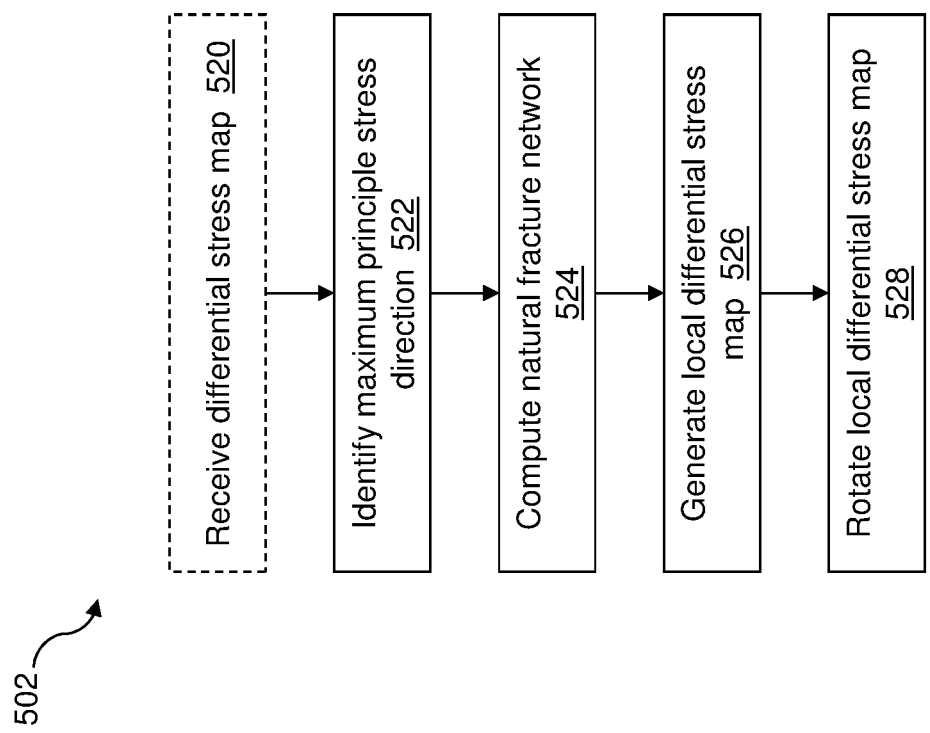
FIG. 5B is an illustration of a flow diagram of an example method to generate a local differential stress map.

FIG. 5B is an illustration of a flow diagram of an example method 502 to generate a local differential stress map. Method 502 builds on method 501 to expand the step 520. In one example, the method 502, or at least some of the steps of the method 502, can be performed by an HF modeler as disclosed herein; such as HF modeler 610 of FIG. 6 that includes a differential stress map generator 612. Method 502 starts at the step 520 to receive the differential stress map and model inputs. Proceeding to a step 522, a maximum principle stress direction is identified. This is the direction in which it is most likely that a fracture will be created. In a step 524, the natural fracture network is computed. The natural fracture network can be overlaid on the differential stress map and used as existing fractures that can interact with the fractures modeled through the fracture model process. Natural fractures can also merge with modeled fractures.

In a step 526, the local differential stress map is generated using the natural fracture network. In a step 528, the local differential stress map is rotated to align with the principle stress direction. The method 502 then continues to the step 530 of method 501 to locate the perforation stage relative to the local differential stress map.

Figure 6:
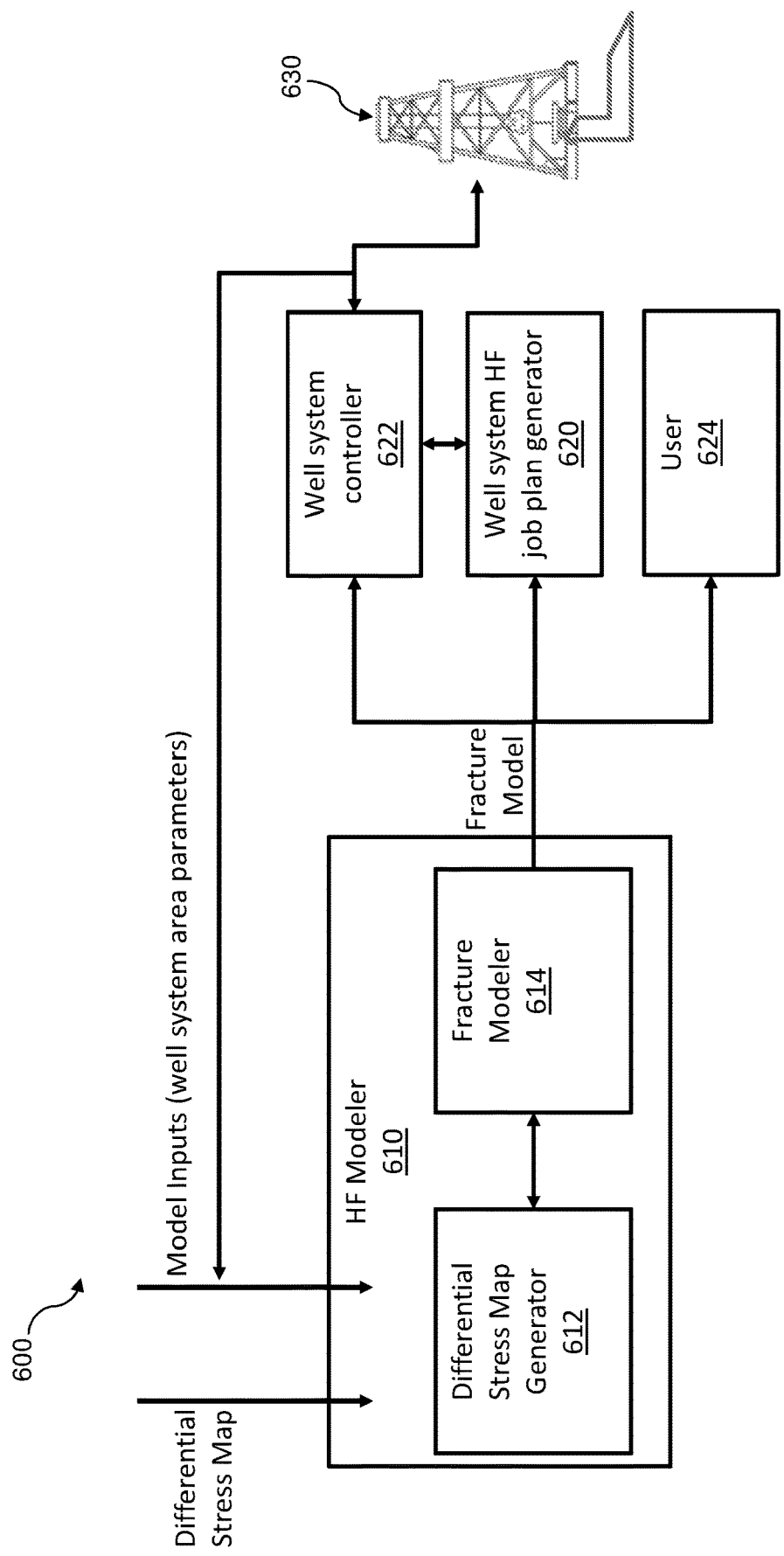
FIG. 6 is an illustration of a block diagram of an example fracture model system.

FIG. 6 is an illustration of a block diagram of an example fracture model system 600. Fracture model system 600 is configured to receive a differential stress map and model inputs as inputs and generate a fracture model representing a simulated HF process as an output. The fracture model can be used by a various systems, components, and users. Fracture model system 600 includes three example optional uses of the fracture model, a well system HF job plan generate 620, a well system controller 622, and a user 624. The well system HF job plan generator 620 can generate a HF job treatment plan and provide that information to the well site controller 622 of a well system 630. In an alternative aspect, the HF job plan generator 620 can be part of the well site controller 622. Alone, or in combination with a HF breakdown analysis, the well site controller 622 can execute HF treatment stages for the well system 630. In addition, well system 630 can provide information, such as HF treatment data HF fluid pressure, HF flow rate, HF fluid composition, and other well system data to the well system controller 622. Well system controller 622 can provide this information as model inputs to the fracture model process. The fracture model process can then be applied for well system 630 or another well system.

Fracture model system 600 includes a HF modeler 610. HF modeler 610 can be a processor or electronic circuitry configured to perform the functionalities described herein. In one example, the HF modeler 610 is a set of instructions running on a computing system, such as an application, function, routine, library, or a portion of an application, that direct the operation of the computing system. In some examples, the HF modeler 610 is a combination of processors and operating instructions. HF modeler 610 includes a differential stress map generator 612 and a fracture modeler 614.

HF modeler 610 is configured to receive the differential stress map and the model inputs. The differential stress map can be generated by other processes, such as a MPM process. The model inputs can include data regarding the well system and wellbore, such as the natural fracture network, the location of the wellbore relative to the differential stress map, the wellbore length, wellbore orientation, rock properties, the principle stress direction, HF stage, perforation stage location, the number of perforations and the length of the stage, and other well system related factors. The model inputs can also include user input parameters, such as the defined differential stress states along with associated HF geometry patterns, whether the stress shadow effect will be used, the grid size, a constant to be used for volumetric mass conservation used with the grid-less model, and other system default or user parameters.

Using the inputs, the differential stress map generator 612 can generate a local differential stress map with the natural fractures overlaid, the grid overlaid, and the map rotated to align with the principle stress direction. The differential stress map generator 612 can also identify the differential stress states for each of the grid locations of the grid overlay. The generated information can then be passed to the fracture modeler 614. Fracture modeler 614 can initialize the fracture structures using the model inputs. Fracture modeler 614 can then execute the propagation steps of the fracture model process until the propagation steps are completed and a fracture model is generated.

Once the fracture model is completed, the HF modeler 610 can communicate the fracture model and associated data to another system. The receiving systems can be a well system HF job plan generator 620, a well system controller 622, or a user or a user system 624. HF job plan generator 620 can use the received fracture model to modify a HF job plan, such as adjusting the location of a wellbore. The fracture model process can be executed using various wellbore locations and the HF job plan generator 620 can select an optimum version. The well system controller 622 can use the fracture model to update an executing HF job plan to make real-time or near real-time adjustments. The user/user system 624 can use the fracture model for the above uses and other uses as well where user interaction is used for further processing. The user/user system 624 can be a display, monitor, printer, smartphone, tablet, laptop, server, and other systems and devices capable of receiving the fracture model and allowing user access to the fracture model.

A portion of the above-described apparatus, systems or methods can be embodied in or performed by various digital data processors or computers, wherein the computers are programmed or store executable programs of sequences of software instructions to perform one or more of the steps of the methods. The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, or functions, systems or apparatuses described herein.

Portions of disclosed embodiments may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include machine code, such as produced by a compiler, and files containing higher level code that may be executed by the computer using an interpreter.

In interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Those skilled in the art to which this application relates will appreciate that other and further additions, deletions, substitutions and modifications may be made to the described embodiments. It is also to be understood that the terminology used herein is for the purpose of describing particular embodiments only, and is not intended to be limiting, since the scope of the present disclosure will be limited only by the claims. Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of the exemplary methods and materials are described herein.

It is noted that as used herein and in the appended claims, the singular forms "a", "an", and "the" include plural referents unless the context clearly dictates otherwise.

Aspects disclosed herein include:

A. A method to generate a fracture model of a well system area with hydraulic fracturing (HF) using a fracture model process, including: (1) receiving model inputs and a differential stress map of the well system area, (2) locating a perforation stage location on the differential stress map, (3) initializing propagation steps utilizing the model inputs and the differential stress map, and (4) executing the propagation steps until an exit condition is true, (5) wherein the propagation steps include (5A) determining a differential stress state for a current portion of the differential stress map proximate to a previous portion of the differential stress map utilized in a previous propagation step, (5B) calculating a HF geometry for the current portion of the differential stress map wherein a total energy value is reduced utilizing the calculated HF geometry, and (5C) updating the fracture model utilizing the HF geometry for the current portion of the differential stress map.

B. A computer program product having a series of operating instructions stored on a non-transitory computer-readable medium that directs a data processing apparatus when executed thereby to perform operations to generate a fracture model of a well system area with hydraulic fracturing (HF) using a fracture model process, the operations including: (1) receiving model inputs and a differential stress map of the well system area, (2) locating a perforation stage location on the differential stress map, (3) initializing propagation steps utilizing the model inputs and the differential stress map, and (4) executing the propagation steps until an exit condition is true, (5) wherein the propagation steps include (5A) determining a differential stress state for a current portion of the differential stress map proximate to a previous portion of the differential stress map utilized in a previous propagation step, (5B) calculating a HF geometry for the current portion of the differential stress map wherein a total energy value is reduced utilizing the calculated HF geometry, and (5C) updating the fracture model utilizing the HF geometry for the current portion of the differential stress map.

C. A system to generate a fracture model of a well system area using hydraulic fracturing (HF), including: (1) a HF modeler, operable to receive model inputs and a stress map of the well system area, and to execute a fracture model process, comprising, (2) a differential stress map generator, operable to generate a local differential stress map utilizing the received stress map, to determine a differential stress state of portions of the local differential stress map, and to identify the maximum principle stress state utilizing the stress map and the model inputs, and (3) a fracture modeler, operable to execute propagation steps across the local differential stress map to update the fracture model utilizing the portions of differential stress states, the model inputs, and the maximum principle stress state, and operable to track a number of propagation steps, and an amount of total energy expended.

Each of aspects A, B, and C can have one or more of the following additional elements in combination: Element 1: wherein the exit condition is set to true where at least one of a total energy value is reduced to substantially zero, a count of propagation steps equals a total time step, and the differential stress map has been completed. Element 2: wherein the current portion of the differential stress map utilized when the fracture model process begins is proximate to the perforation stage location. Element 3: wherein the calculating a HF geometry utilizes neighbor portions of the differential stress map, the differential stress state, and the model inputs, wherein the neighbor portions had the HF geometry calculated in the previous propagation step. Element 4: utilizing the fracture model to determine at least one of a well placement location within the well system and a HF job plan of the well system. Element 5: wherein the model inputs include at least one of the perforation stage location, a perforation count, a perforation interval length, the total energy value, and a total time step. Element 6: wherein the receiving the differential stress map further includes receiving a stress map of the well system area, wherein the stress map is generated from a stress analysis method. Element 7: wherein the receiving the differential stress map further includes identifying a maximum principal stress direction of each fracture utilizing the stress map. Element 8: wherein the receiving the differential stress map further includes computing a natural fracture network using the stress map, the maximum principle stress direction, and a geological information determined from the natural fracture network. Element 9: wherein the receiving the differential stress map further includes generating a local differential stress map utilizing the natural fracture network and the stress map. Element 10: wherein the receiving the differential stress map further includes rotating the local differential stress map to align with the maximum principle stress direction. Element 11: wherein the calculating the HF geometry further includes constraining the calculating utilizing mass conservation, energy conservation, multi-fracture interaction, and stress field orientation. Element 12: wherein the constraining further includes a HF fluid leak-off calculation. Element 13: wherein the constraining further includes a stress shadow effect. Element 14: wherein the calculating the HF geometry merges two or more fractures. Element 15: wherein the model inputs further includes a wellbore length, a wellbore orientation, and a HF stage. Element 16: wherein the calculating the HF geometry further includes pre-processing the current portion of the differential stress map, wherein the pre-processing includes determining at least one of the current portion is outside of the differential stress map, the current portion already has fractures, the total energy value is sufficient to fracture the current portion, the total energy value is sufficient to complete the HF geometry, and the total energy value is sufficient to enable a stress shadow effect. Element 17: wherein the calculating the HF geometry further includes determining to bypass a current propagation step utilizing the pre-processing. Element 18: wherein the current portion of the differential stress map is determined utilizing a fracture volume calculated volumetrically at the end of each of the propagation steps, and wherein the calculating the HF geometry utilizes the angle and length of a fracture. Element 19: wherein the fracture model process utilizes a machine learning algorithm, and wherein the machine learning algorithm utilizes well system area property constraints. Element 20: wherein the fracture model process is executed on a well site controller of the well system area, and the fracture model is utilized to update a HF job plan. Element 21: a well system HF job plan generator, operable to modify a well system HF job plan utilizing the fracture model. Element 22: a well system controller, operable to adjust a HF job plan utilizing the fracture model, and to provide model inputs to the HF modeler, wherein the well system controller is located proximate to the well system area.

What is claimed is:

1. A method to generate a fracture model of a well system area with hydraulic fracturing (HF) using a fracture model process, comprising:
   receiving model inputs and a differential stress map of the well system area, wherein the differential stress map is generated from a stress analysis method;
   generating a local differential stress map by:
   identifying a maximum principal stress direction for fractures utilizing the differential stress map of the well system area;
   computing a natural fracture network using the differential stress map of the well system area, the maximum principle stress direction, and geological information;
   generating the local differential stress map utilizing the natural fracture network and the differential stress map of the well system area; and
   rotating the local differential stress map to align with the maximum principle stress direction;
   locating a perforation stage location on the differential stress map relative to the local differential stress map;
   initializing propagation steps utilizing the model inputs and the differential stress map;
   executing the propagation steps until an exit condition is true;
   wherein the propagation steps comprise:
   determining a differential stress state for a current portion of the differential stress map proximate to a previous portion of the differential stress map utilized in a previous propagation step;
   calculating a HF geometry for the current portion of the differential stress map wherein a total energy value is reduced utilizing the calculated HF geometry; and
   updating the fracture model utilizing the HF geometry for the current portion of the differential stress map; and
   executing an HF well plan using the updated fracture model.

2. The method as recited in claim 1, wherein the exit condition is set to true where at least one of a total energy value is reduced to substantially zero, a count of propagation steps equals a total time step, and the differential stress map has been completed.

3. The method as recited in claim 1, wherein the current portion of the differential stress map utilized when the fracture model process begins is proximate to the perforation stage location.

4. The method as recited in claim 1, wherein the calculating the HF geometry utilizes neighbor portions of the differential stress map, the differential stress state, and the model inputs, wherein the neighbor portions had the HF geometry calculated in the previous propagation step.

5. The method as recited in claim 1, further comprising utilizing the updated fracture model to determine a well placement location within the well system.

6. The method as recited in claim 1, wherein the model inputs include at least one of a perforation count, a perforation interval length, the total energy value, and a total time step.

7. The method as recited in claim 1, wherein the calculating the HF geometry further comprises:
   constraining the calculating utilizing mass conservation, energy conservation, multi-fracture interaction, and stress field orientation.

8. The method as recited in claim 7, wherein the constraining further includes a HF fluid leak-off calculation.

9. The method as recited in claim 7, wherein the constraining further includes a stress shadow effect.

10. The method as recited in claim 1, wherein the calculating the HF geometry merges two or more fractures.

11. The method as recited in claim 1, wherein the model inputs include a wellbore length, a wellbore orientation, and a HF stage.

12. The method as recited in claim 1, wherein the calculating the HF geometry further comprises:
pre-processing the current portion of the differential stress map, wherein the pre-processing includes determining at least one of the current portion is outside of the differential stress map, the current portion already has fractures, the total energy value is sufficient to fracture the current portion, the total energy value is sufficient to complete the HF geometry, and the total energy value is sufficient to enable a stress shadow effect; and
determining to bypass a current propagation step utilizing the pre-processing.

13. The method as recited in claim 1, wherein the current portion of the differential stress map is determined utilizing a fracture volume calculated volumetrically at the end of each of the propagation steps, and wherein the calculating the HF geometry utilizes the angle and length of a fracture.

14. The method as recited in claim 1, wherein the fracture model process utilizes a machine learning algorithm, and wherein the machine learning algorithm utilizes well system area property constraints.

15. The method as recited in claim 1, wherein the fracture model process is executed on a well site controller of the well system area.

16. The method as recited in claim 1, wherein the executing the well plan is performed in real time.

17. A computer program product having a series of operating instructions stored on a non-transitory computer-readable medium that directs one or more processors when executed thereby to perform operations to generate and use a fracture model of a well system area with hydraulic fracturing (HF) using a fracture model process, the operations comprising:
receiving model inputs and a differential stress map of the well system area, wherein the differential stress map is generated from a stress analysis method;
generating a local differential stress map by:
identifying a maximum principal stress direction for fractures utilizing the differential stress map of the well system area;
computing a natural fracture network using the differential stress map of the well system area, the maximum principle stress direction, and geological information;
generating the local differential stress map utilizing the natural fracture network and the differential stress map of the well system area; and
rotating the local differential stress map to align with the maximum principle stress direction;
locating a perforation stage location on the differential stress map relative to the local differential stress map;
initializing propagation steps utilizing the model inputs and the differential stress map;
executing the propagation steps until an exit condition is true;
wherein the propagation steps comprise:
determining a differential stress state for a current portion of the differential stress map proximate to a previous portion of the differential stress map utilized in a previous propagation step;
calculating a HF geometry for the current portion of the differential stress map wherein a total energy value is reduced utilizing the calculated HF geometry; and
updating the fracture model utilizing the HF geometry for the current portion of the differential stress map; and
executing an HF well plan using the updated fracture model.

18. The computer program product as recited in claim 17, wherein the calculating the HF geometry further comprises:
constraining the calculating utilizing mass conservation, energy conservation, multi-fracture interaction, and stress field orientation.

19. The computer program product as recited in claim 17, wherein the calculating the HF geometry further comprises:
pre-processing the current portion of the differential stress map, wherein the pre-processing includes determining at least one of the current portion is outside of the differential stress map, the current portion already has fractures, the total energy value is sufficient to fracture the current portion, the total energy value is sufficient to complete the HF geometry, and the total energy value is sufficient to enable a stress shadow effect; and
determining to bypass a current propagation step utilizing the pre-processing.

20. The computer program product as recited in claim 17, wherein the executing the well plan is performed in real time.

* * * * *